United States Patent [19]

Leventis et al.

[11] Patent Number: 5,282,955
[45] Date of Patent: Feb. 1, 1994

[54] ELECTRICALLY CONDUCTIVE POLYMER COMPOSITION, METHOD OF MAKING SAME AND DEVICE INCORPORATING SAME

[75] Inventors: Nicholas Leventis; Young C. Chung, both of Somerville, Mass.

[73] Assignee: Molecular Displays, Inc., Andover, Mass.

[21] Appl. No.: 717,892

[22] Filed: Jun. 19, 1991

[51] Int. Cl.⁵ .................................................. C25D 9/02
[52] U.S. Cl. ............................................................ 205/317
[58] Field of Search .................................................. 204/56.1

[56] References Cited

U.S. PATENT DOCUMENTS

| | | | |
|---|---|---|---|
| 4,818,352 | 4/1989 | Inaba | 204/56.1 |
| 4,839,322 | 6/1989 | Yodice | 204/72 |
| 4,933,052 | 6/1990 | O'Brien | 204/72 |
| 5,002,700 | 3/1991 | Otagawa | 204/72 |

OTHER PUBLICATIONS

Ikeda, O., et al., *Polyprrole Film Electrodes Electrochemically Doped with Colloidal Prussian Blue*, J. Electroanal. Chem. 265:323–327 (1989).

*Primary Examiner*—T. M. Tufariello
*Attorney, Agent, or Firm*—Barry Evans

[57] ABSTRACT

The disclosure relates, inter alia, to a composition and, a method of making the composition. The composition comprises an electrically conductive polymer having a porous structure and a compound formed in situ and coating at least a portion of the surfaces of said polymer. The method of making the composition comprises forming an electrically conductive polymer having a porous structure, contacting the surfaces of the polymer with a solution comprising chemical species capable of being electrochemically formed into a coating material on the surfaces of said structure and electrochemically forming the coating material on the surfaces of the structure.

21 Claims, 16 Drawing Sheets

FIG. 9A
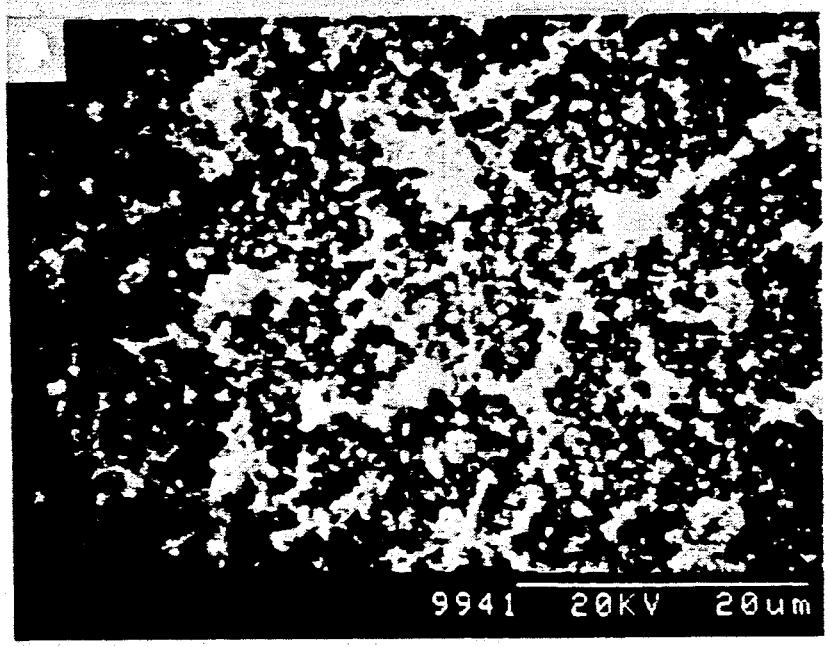
FIG. 9B

FIG. 10A
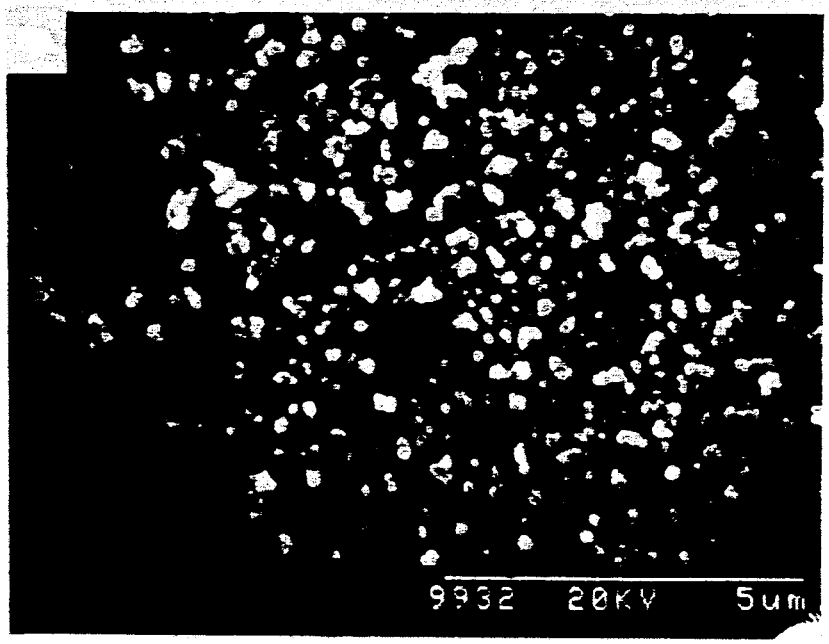
FIG. 10B

ND DEVICE INCORPORATING SAME

ELECTRICALLY CONDUCTIVE POLYMER COMPOSITION, METHOD OF MAKING SAME AND DEVICE INCORPORATING SAME

BACKGROUND OF THE INVENTION

This invention relates to compositions employing electrically conductive polymeric materials which are particularly suitable for use in electrochromic systems, to processes for making those compositions and to electrochromic displays using those compositions.

Several reduction-oxidation (redox) active materials are very intensely colored in one redox state, but not in another. Such materials are called electrochromic. Ideally, electrochromic materials for display applications are very insoluble and can be coated on conductive surfaces. A preferred method for coating electrochromic materials onto electrode surfaces is by electrochemical deposition. Several problems have been encountered with electrochromic coatings, e.g. their lack of long term stability, probably due to poor adhesion to electrode surfaces, and their switching speed which diminishes as the coating is made thicker in order to improve the optical effects.

There has been considerable interest in the application of conductive polymers in electrochromic displays. The term "conductive polymer" refers to a class of polymeric materials that possesses electrical conductivity and which can sometimes be comparable to that of metals. Unlike metals, however, conductive polymers are not always conductive. They are usually in a conductive state only when at least partially oxidized. Reduced (i.e., neutral) conductive polymers usually have conductivities that are several orders of magnitude lower than their conductivities when oxidized.

Conducting polymers have distinctly desirable features for display applications. These include rapid response to an applied potential (i.e., high switching speed), durability, low average power consumption under repetitive potential cycling and an extremely low solubility that makes them ideal for coating on electrodes. Unfortunately, while some electrically conductive polymers exhibit electrochromic properties, a disadvantage in display applications is that in order to realize intense coloration, one has to use them in layers (coatings) of such thickness that their switching speed is adversely affected. Moreover when used in thick coatings they have poor durability and their average power consumption is high.

A need exists for electrochromic materials which can be immobilized on electrode surfaces for use in display systems. Moreover, there is a need for new electrochromic materials that have a rapid response, high durability and low average power consumption as well as intense coloration.

OBJECTS OF THE INVENTION

It is a primary object of the invention to provide improved electrochromic compositions which may be useful as coatings on electrochromic displays.

It is a further object of the invention to provide such compositions having rapid response to an applied potential, durability, low average power consumption under repetitive potential cycling and extremely low solubility. It is still a further object of this invention to provide compositions which have intense coloration even when used in thin layers.

It is still a further object of this invention to provide methods for preparing the electrochromic compositions of the invention.

BRIEF SUMMARY OF THE INVENTION

The composition of the present invention comprises an electrically conductive polymer with a porous structure having an electrochromic compound coated on the surfaces of the pores of the structure. By "electrically conductive polymer" is meant a polymer having a conductivity of at least 0.01 Siemens per centimeter.

The process of the invention comprises forming a structure of an electrically conductive polymer having an open network of pores. The polymer is exposed to a solution comprising chemical species capable of forming at least one compound which is insoluble and capable of bonding to the surfaces (internal and external) of the polymer. An electrical potential is applied to the polymer causing the species to electrochemically form at least one insoluble compound bonded to the surfaces of the polymeric material.

BRIEF DESCRIPTION OF THE DRAWING

FIG. 9 is a scanning electron photomicrograph which in portion A (FIG. 9A) shows the surface topology of a specimen of poly(3-methylthiophene) on a platinum electrode, and in portion B (FIG. 9B) shows the surface topology of a specimen of a poly(3-methylthiophene)-Prussian blue composition of the present invention, the magnification of FIG. 9 being indicated by the white horizontal line which reflects a length of 20 microns;

FIG. 10 is a scanning electron photomicrograph which in portion A (FIG. 10A) shows the surface topology of a specimen of poly(3-methylthiophene) on a platinum electrode, and in portion B (FIG. 10B) shows the surface topology of a specimen of a poly(3-methylthiophene)-Prussian blue composition of the invention, the magnification of FIG. 11 being greater than FIG. 10 and being indicated by the white horizontal line which reflects a length of 5 microns;

DETAILED DESCRIPTION OF THE INVENTION

Figure 1:
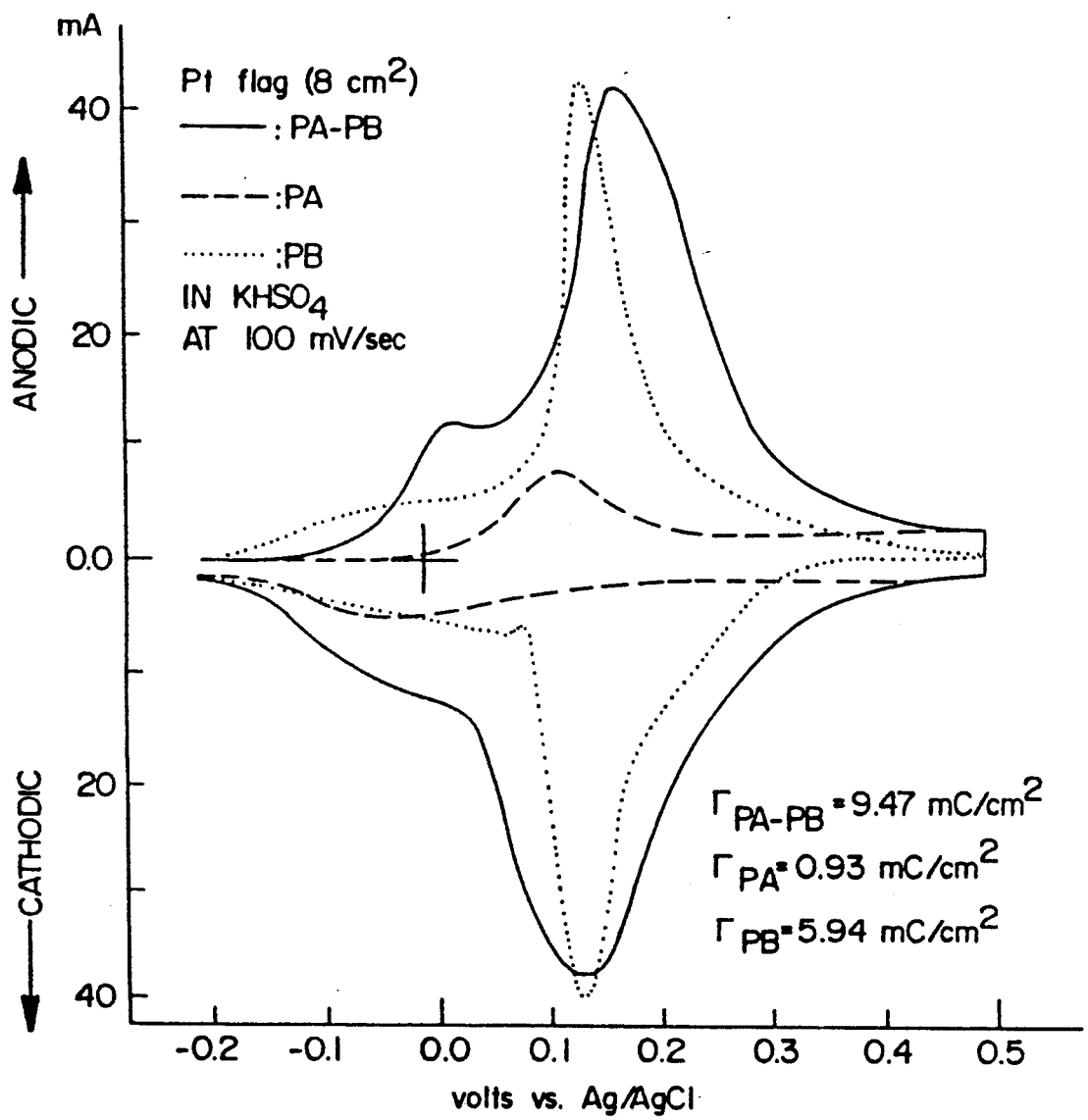
FIG. 1 is a cyclic voltammogram of poly(aniline) on a platinum electrode (dashed line showing) in a solution also containing potassium bisulfate, of Prussian blue on a platinum electrode (dotted line showing) in a solution also containing potassium bisulfate and of a poly(aniline)-Prussian blue composition of the invention (solid line showing) in a solution also containing potassium bisulfate.

A preferred composition of the invention, includes an electrically conductive polymer having an electrochromic material comprising a metal cyanometallate coating at least a portion of the surfaces thereof. The invention also has application to catalyst systems and electrical storage devices in that the in situ formed compound may have catalytic or high density charge capacitance characteristics. The composition is prepared by forming a bulk structure of an electrically conductive polymer and either simultaneously with that formation step or subsequent thereto forming an electrochromic material in situ within that bulk structure so that the electrochromic material coats the interior and exterior surfaces thereof.

In the process for making the composition an electrode made of an electrically conductive material such as metallic platinum, gold or tin oxide ($SnO_2$) is coated with the electrically conductive polymer by electrodeposition. The polymer is electrodeposited on the electrode from a solution containing its corresponding monomer(s). The preferred concentration of monomer is from about 0.5 millimolar to about 1.0 molar. The solution may be deaerated before polymerization by stirring and by bubbling an inert gas, such as argon, through it.

Desirable monomers for forming electrically conductive polymers for use in the invention are aniline, 3-alkylthiophene (e.g.,3-methylthiophene), 2-aminonaphthalene, 3-aminonapthalene, 2-aminopyrene, thiophene, 2,2'-bithiophene, isothianaphthene, thiophenol, thienylenevinylene, furan, pyrrole, N-methylpyrrole and N-phenylpyrrole. The polymers may be homopolymers or copolymers of the foregoing and may be in the form of a blend, mixture or alloy of polymers of the foregoing with other polymers. It should be understood that the electrically conductive polymers may also include polymers of substituted monomers. The preferred polymers are poly(aniline), poly(3-methylthiophene) and poly(pyrrole).

An electrical potential varying with time is applied to the electrode to cause electropolymerization and electrodeposition of the polymer from the monomer solution on the electrode. The voltage and current are dependent on the polymer system being formed and can be determined by one skilled in the art. In the case of poly(aniline), poly(3-methylthiophene) and poly(pyrrole), the potential is swept between the initial and final potential limits (vs. Ag/AgCl reference electrode) given below:

| Polymer | Initial Potential | Final Potential |
| --- | --- | --- |
| Poly(aniline) | −0.2 V | +0.75 V |
| Poly(3-methythiophers) | −0.1 V | +1.8 V |
| Poly(pyrrole) | −0.6 V | +0.8 V |

The rate at which the potential is varied may be from about 10 to about 1000 millivolts per second, a rate of about 100 millivolts per second being preferred. Electrodeposition can also be conducted galvanostatically, i.e., by fixing the current at a value at which the potential of the electrode will not exceed the final potential from the preceding table, or potentiostatically, i.e., by fixing the potential of the electrode at a value close (within 100 millivolts) to the upper value of the potential range given in the preceding table.

The electrodeposition is continued until an electrically conductive polymer completely covers the electrode with a pin-hole free coating. There may also be circumstances under which "pin-holes" or voids are desirable. Best results, i.e. fast switching speed and color saturation, are achieved with a relatively light polymer coverage on the electrode, a layer of polymer so thin that even though it covers the electrode completely with no pinholes, it is not visible to the naked eye. This coating nevertheless provides the polymer in a bulk form which has an open internal structure in which there are pores or voids communicating with each other and with the exterior of the bulk. These pores or voids are bounded by, or defined by, the internal surfaces of the polymer. The effective surface area presented by the structure of the polymer material (i.e., the external and the internal surfaces) is much larger than the external surface alone of the bulk of the polymer. The electrically conductive polymer acts as an extended electrode and provides a much larger effective surface area than the exterior of the bulk alone.

The material incorporated into the internal structure of the polymer is preferably formed in situ within that structure either (1) by exposing the surfaces of its structure to a solution including chemical species capable of forming that material, and electrochemically forming and electrodepositing that material on those surfaces, or (2) by forming the electrically conductive polymer from a solution which includes not only the monomer(s) for the polymer but also those chemical species which form the electrochromic material so that the material is incorporated into the molecular structure of the polymer.

In the preferred process, the chemical species which are precursors to the electrochromic material are provided in a solution and the polymer is exposed to the solution. The solution may be deaerated and agitated by bubbling an inert gas, such as argon, through it. In selecting an electrochromic material for formation upon the surfaces of the polymer, it is desirable that the potential for the formation of that material falls within the conductivity window of the electrically conductive polymer. In addition, it is highly desirable for the electrochromic compound to be capable of being irreversibly precipitated and preferably bound to the polymer under the conditions that the polymer will be subjected to in service. The compound may be covalently bound to the surfaces of the polymer.

In the preferred embodiment the electrochromic material incorporated into the polymer is a metal cyanometallate. An electrical potential, varying over time, is applied to the polymer which is dependent on the material being deposited. In the case of a Prussian blue system, the potential is swept between initial and final potential limits (vs. Ag/AgCl reference electrode) which are:

| Electrochromic Material | Initial Potential | Final Potential |
|---|---|---|
| Prussian blue | +0.6 V | +0.2 V |

The rate at which the potential is varied may be from about 10 to about 1000 millivolts per second, a rate of about 100 millivolts per second being preferred.

The ratio of the number of redox active units of the electrochromic material to the number of monomer units should be from about 0.1:1 to about 20:1. Preferably the number of redox units should be in excess to the number of monomer units.

A preferred group of electrochromic compounds for electrochemical formation within the electrically conductive polymer are the transition metal cyanometallates, particularly the transition metal hexacyanometallates, and electrochromic metal oxides. Suitable metals are iron, ruthenium, osmium, cobalt, nickel, tungsten, molybdenum, chromium, platinum, palladium and rhodium for the metal or metallate. Specific compounds are prussian blue (ferric ferrocyanide or potassium ferric ferrocyanide), ruthenium ruthenocyanide, osmium purple (ferric osmocyanide), ferric carbonylpentacyanoferrate, ferric pentacyanonitroferrate, silver hexacyanoferrate, cupric hexacyanoferrate and, Group VIa, VIIa, VIII and Ib hexacyanocobaltates. Electrochromic oxides, such as iridium and nickel oxide, are also suitable.

The insoluble compound is formed electrochemically from the solution within the bulk structure of the electrically conductive polymer, and, ideally becomes bonded to the polymer to form an improved composition material. The insoluble compound is electrochromic. The preferred electrochromic compound is Prussian blue, which can be formed electrochemically from a solution of a ferrocyanide moiety and a trivalent iron moiety. For example, the Prussian blue may be formed in situ within poly(aniline) which covers an electrode by using an aqueous solution of both potassium ferrocyanide and ferric sulfate.

The process of the invention provides for precise control over the amount of conductive polymer that is deposited as a substrate for the deposition of the electrochromic compound, such as Prussian blue, and over the amount of the electrochromic compound that is then deposited in the conductive polymer, so that the optimal optical effects are achieved. The conductive polymer completely covers an electrode, i.e., it is pin-hole free, and comprises an "extended" electrode of much larger surface area than the original electrode. This is because the polymeric chains of the conductive polymer virtually behave as microwires with much larger effective surface area.

The compositions comprising Prussian blue (PB) formed in situ and deposited within the bulk of polyaniline have advantageous properties. Films of these compositions display dramatic electrochromic properties, changing from an almost colorless state to a very aesthetically pleasing blue colored state. These films appear promising as components in electrochromic displays.

The invention is further illustrated by the following examples which are not intended to be limiting.

EXAMPLE 1

Preparation of Poly(aniline)-Prussian Blue Composition

The preparation of a poly(aniline)-Prussian blue film in which poly(aniline) was the electrically conductive polymer and Prussian blue was the electrochromic compound was accomplished in two steps.

The electrochemical experiments of Examples 1 through 3 were performed using a PINE RDE4 bipotentiostat; the counter electrode was platinum gauze and all potentials were referenced to a commercial Ag/AgCl electrode (BAS). All solutions were degassed by bubbling argon through them.

All platinum flag working electrodes were cleaned in $H_2O_2$/concentrated $H_2SO_4$ solutions (1:4 volume to volume), and pretreated with an oxidizing flame before use. Gold interdigitated microelectrode arrays were used for the conductivity experiments which were purchased from Microsensor Systems Inc. as Part No. 301 and they share 40 finger pairs, each finger being 20 microns wide, 3.2 millimeters long and spaced 20 microns apart from each adjacent finger. The arrays were cleaned with the same $H_2O_2$/concentrated $H_2SO_2$ solution as above before use. Electrical connection of the interdigitated fingers by the deposited material was checked by cyclic voltammetry, through procedures well known in the art.

Scanning Electron Micrographs were obtained on a Hitachi Model S-530 instrument.

ESCA (Electron Spectroscopy for Chemical Analysis) was performed on a Surface Science Instruments Model SSX-100 instrument. The X-ray beam was focused at a one millimeter diameter spot.

First, a poly(aniline) film was electrodeposited on a platinum electrode surface by cycling the potential of the electrode at a rate of 100 millivolts per second from -0.2 volts to +0.75 volts (vs. an Ag/AgCl reference electrode) in an aqueous solution of aniline (0.25 molar concentration) containing also $H_2SO_4$ (0.5 molar concentration) which was first deaerated and stirred by bubbling argon through it. Then, Prussian blue was electrodeposited within the poly(aniline) film from a deaerated aqueous 0.5 molar concentration $KHSO_4$ solution containing a 1 millimolar concentration of both $K_3[Fe(CN)_6]$ and $Fe_2(SO_4)_3$ by cycling the potential of the electrode from +0.6 volt (rest potential) to +0.2 volt (vs. Ag/AgCl reference electrode) at a rate of 100 millivolts per second. The pH of the solution may be from about 0.0 to about 4.0 with the same effect. In this electrolyte and potential range, poly(aniline) is in its oxidized state and, therefore electrically conductive. Prussian blue loading is at a rate of an approximately ten fold excess with respect to poly(aniline) (ten redox active units of Prussian blue per monomer unit in poly(aniline).) FIG. 1 shows the cyclic voltammograms of poly(aniline) before Prussian blue deposition, of the poly(aniline)/Prussian blue composite material, and of Prussian blue by itself, all in a 0.5 molar $KHSO_4$ solution. It is apparent from FIG. 1 that the cyclic voltammogram of the poly(aniline) - Prussian blue composite material retains the features of both poly(aniline) and Prussian blue and the observed waves in FIG. 1 can be attributed to Equation I, and Equation II.

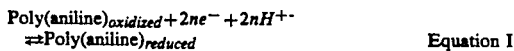

Poly(aniline)$_{oxidized}$ + 2ne$^-$ + 2nH$^+$ $\rightleftharpoons$ Poly(aniline)$_{reduced}$     Equation I

Prussian blue + 4K$^+$ + 4e$^-$ $\rightleftharpoons$ Everitt's Salt     Equation II Poly(aniline) oxidized and poly(aniline) reduced, respectively in Equation I indicate the oxidized and reduced forms of poly(aniline), while Prussian blue in Equation II contains an undetermined amount of water molecules.

Figure 2A:
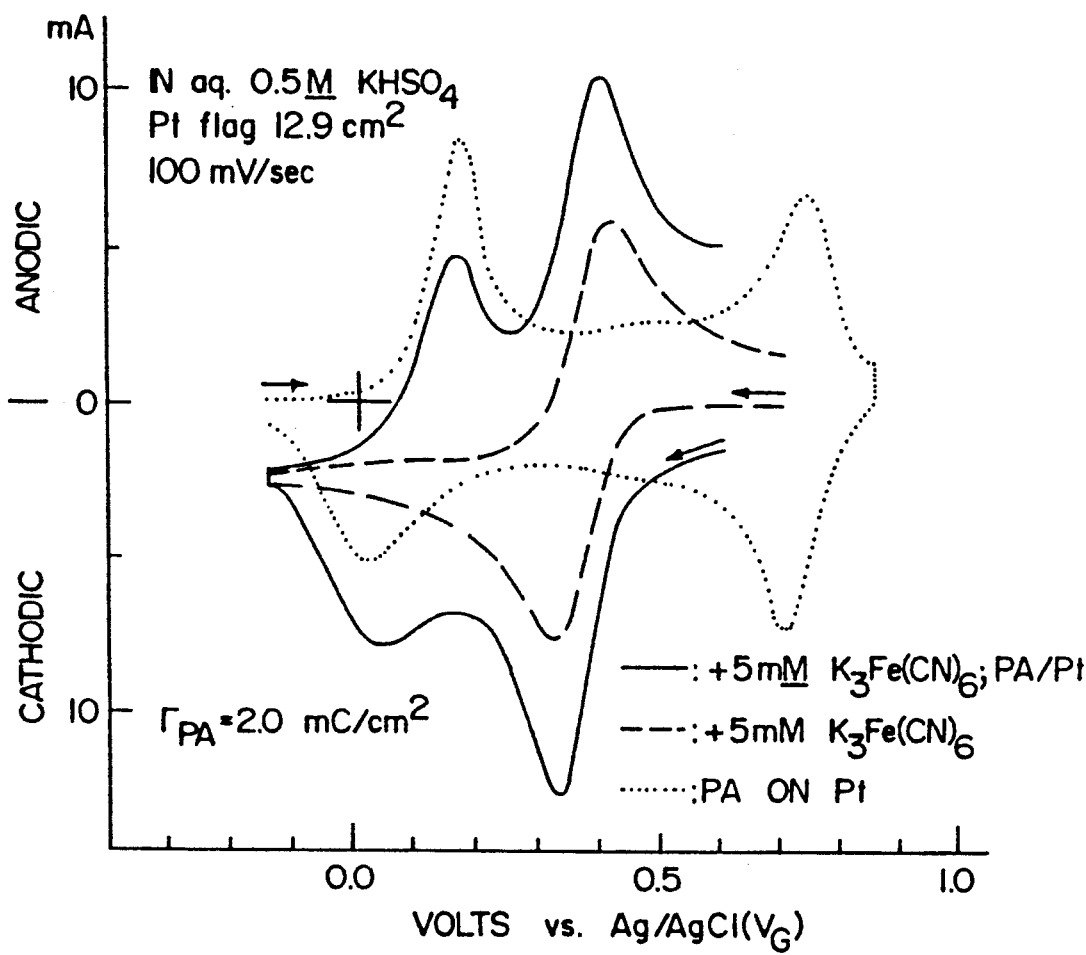
FIG. 2 is a drawing which in portion A (FIG. 2A) is a cyclic voltammogram of poly(aniline) on a platinum electrode (dotted line showing), of the same poly(aniline) covered platinum electrode in a solution containing also potassium ferricyanide (solid line showing) and of a bare platinum electrode in the same solution that contains also potassium ferricyanide (dashed line showing), and which in portion B (FIG. 2B) is a conductivity profile that shows as a function of potential (i.e., oxidation state) the current that passes between two electrodes (see inset schematic diagram) covered and connected by poly(aniline) (open circle showing), or by the poly(aniline) - Prussian blue composite (solid circle showing) of the invention.
Figure 2B:
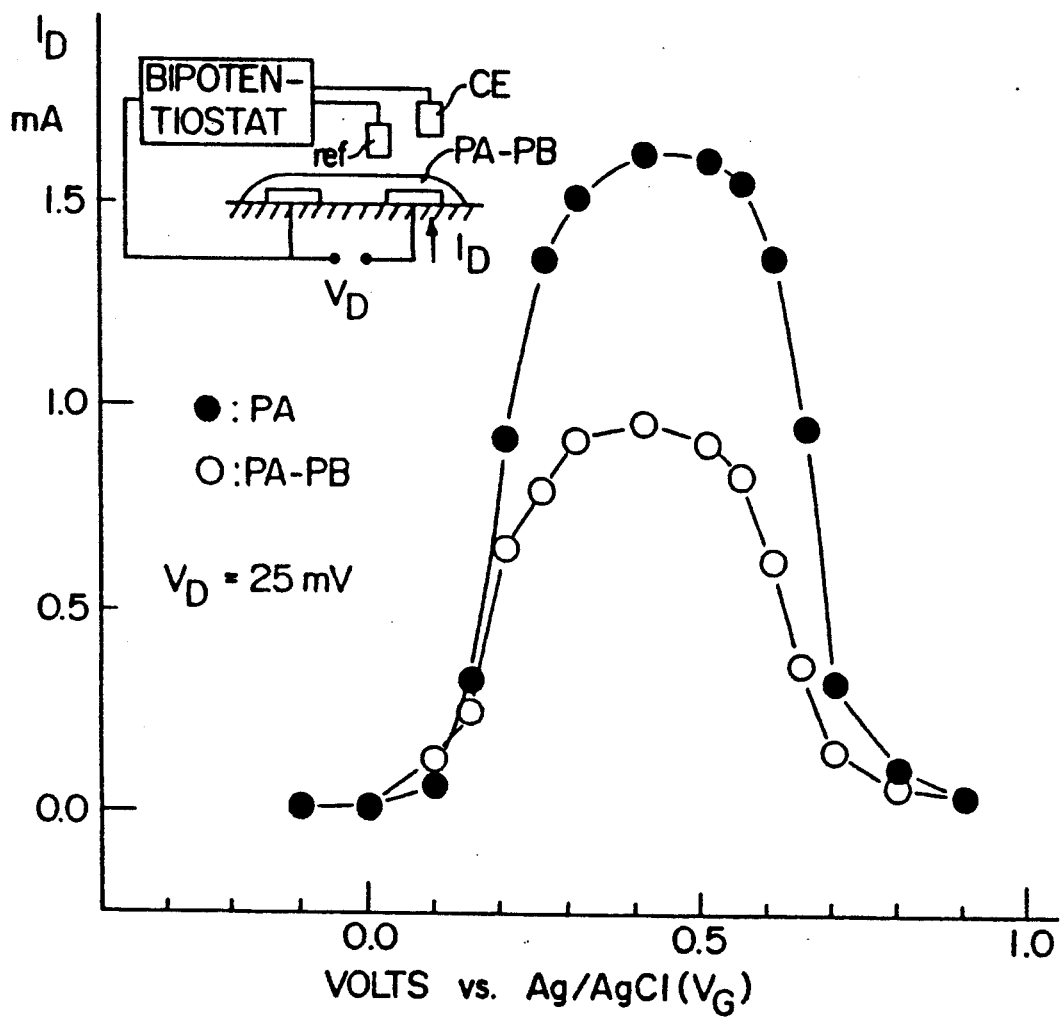

Prussian blue electrodeposition involves reduction of $[Fe(CN)_6]^{-3}$. FIG. 2A illustrates the conditions under which the $[Fe(CN)_6]^{-3}$ species is reduceable on polyaniline. FIG. 2A also shows the cyclic voltammogram of a polyaniline derivatized platinum flag electrode in an aqueous 0.5 molar $KHSO_4$ solution for an electrode coverage of 2.0 millicoulombs per square (dotted line showing). The same electrode then is placed in another solution having a solution having a 5 millimolar concentration of $K_3[Fe(CN)_6]$. As can be seen in FIG. 2A the reduction wave of $[Fe(CN)_6]^{-3}$ is superimposed on the cyclic voltammogram of polyaniline (solid line showing). For comparison purposes the cyclic voltammogram of the same platinum electrode before it was covered with polyaniline is given for the same electrolyte containing also 5 millimolar concentration of $K_3[Fe(CN)_6]$ (dashed line showing). These results can be explained by consulting FIG. 2B which demonstrates how the conductivity of poly(aniline) varies with potential. The data shown in FIG. 2B were obtained following procedures well known in the art using an interdigitated array of microelectrodes connected with poly(aniline). As can be seen in FIG. 2B, poly(aniline) is fully conducting in the potential region where $[Fe(CN)_6]^{3-}$ is reduced. This means that, practically, there is no difference between the platinum electrode, and the poly(aniline)-covered platinum electrode in the potential range where poly(aniline) is conducting. Indeed, the reduction potential of $[Fe(CN)_6]^{3-}$ redox couple is located at +360 millivolts to $[Fe(CN)_6]^{4-}$ (versus an Ag/AgCl reference electrode) for both platinum and poly(aniline) electrodes. (The reduction potential is calculated as the average of the peak potentials from the cyclic voltammogram.) The peak-to-peak separation is 80 millivolts on platinum, but only 50 millivolts on poly(aniline). This may indicate a contribution from a "thin layer" type of reduction of $[Fe(CN)_6]^{3-}$ on poly(aniline), that is, reduction taking place within the bulk of polymer. The portion of $[Fe(CN)_6]^{3-}$ that is reduced within the poly(aniline) layer, is responsible for the loading of poly(aniline) with Prussian blue, when this reduction takes place in the presence of $Fe^{III}$ (from $Fe_2(SO_4)_3$).

FIG. 2B also suggests several reasons for the stability of the poly(aniline)-Prussian blue composite. As can be seen there, the conductivity of the poly(aniline)-Prussian blue composite is decreased compared to the conductivity of poly(aniline) alone. This is probably due to coordination of terminal iron(III) ions of the Prussian blue lattice to nitrogen atoms in the poly(aniline) polymer chain. It is generally accepted on the other hand, however, that the lone electron pairs of the nitrogen atoms of poly(aniline) are utilized to form quinoid sub-units on the poly(aniline) chains upon oxidation. These quinoid sub-units play an important role in the conductivity of oxidized poly(aniline), and it is apparent that if their formation is prevented (as through the aforesaid coordination to the lone electron pairs on nitrogen), then oxidized poly(aniline) will not be as conductive as poly(aniline) alone, but the poly(aniline)-Prussian blue composite will be very stable.

Figure 3:
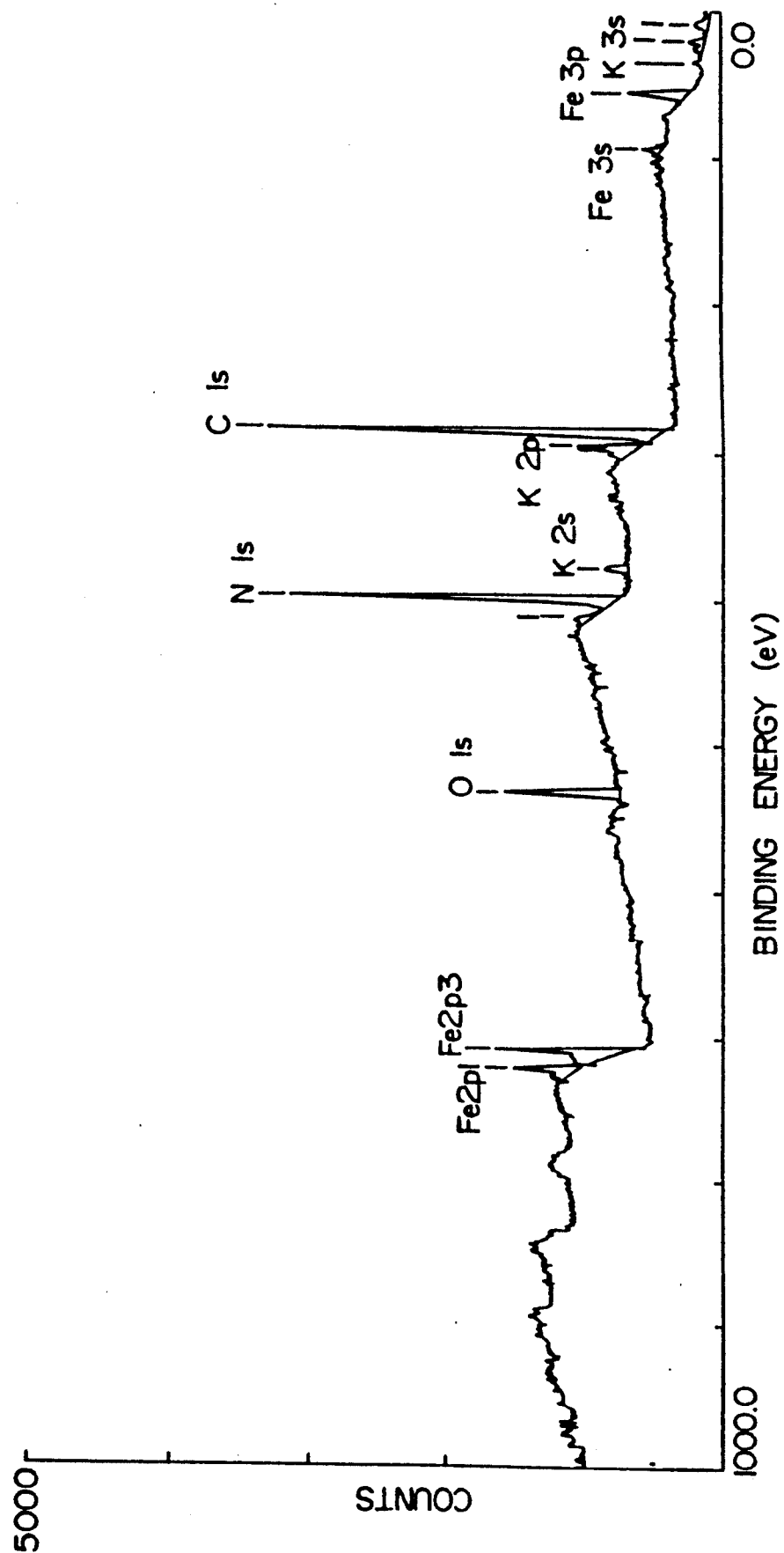
FIG. 3 is an ESCA spectrum of a poly(aniline) - Prussian blue composite in accordance with the invention.

FIG. 3 shows ESCA (Electron Spectroscopy for Chemical Analysis) surface analysis data of the poly(aniline)-Prussian blue composite. The sample was characterized by cyclic voltammetry in $H_2O/0.5$ molar $KHSO_4$ before ESCA measurements were made, and it was disconnected from potential control at +0.5 volts so that the material was in its blue state. At this potential poly(aniline) is fully oxidized, and it is expected to retain some electrolyte. The retention of electrolyte explains the weak potassium, sulfur and oxygen peaks in the ESCA spectrum. On the other hand peaks that correspond to both poly(aniline) and Prussian blue are apparent, which reinforces the hypothesis that Prussian blue does not just lay on the surface of the poly(aniline) layer, but rather it is distributed throughout the bulk of the polymer. Only part of the Prussian blue covers the outside of the poly(aniline) layer. The rest is distributed throughout the polymer, at least partially covering the poly(aniline) polymeric chains.

Figure 4A:
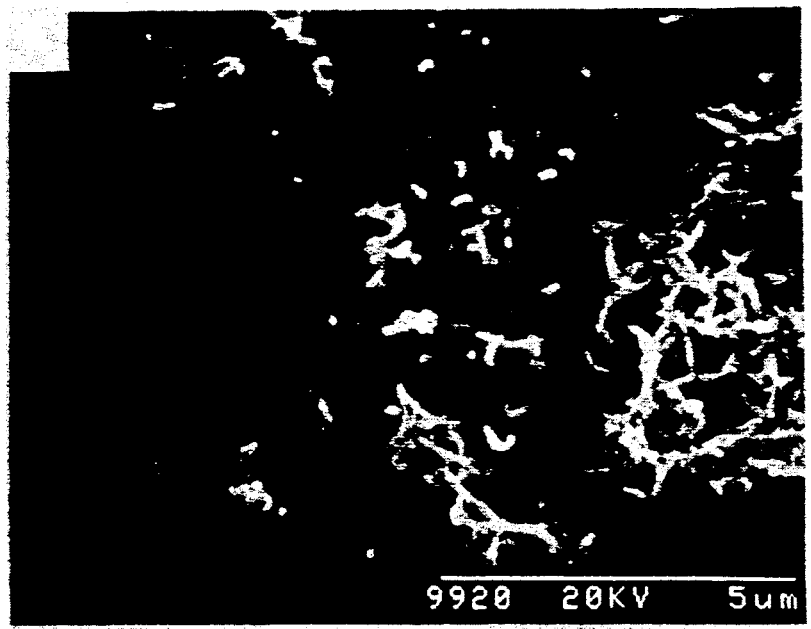
FIG. 4 is a scanning electron photomicrograph which in portion A (FIG. 4A) shows the surface topology of a specimen of poly(aniline) resting on a platinum electrode, and in portion B (FIG. 4B) shows the surface topology of a specimen of a poly(aniline)-Prussian blue composition of the invention resting also on a platinum electrode, the magnification of FIG. 4 being indicated by the white horizontal line which reflects a length of 5 microns.
Figure 4B:
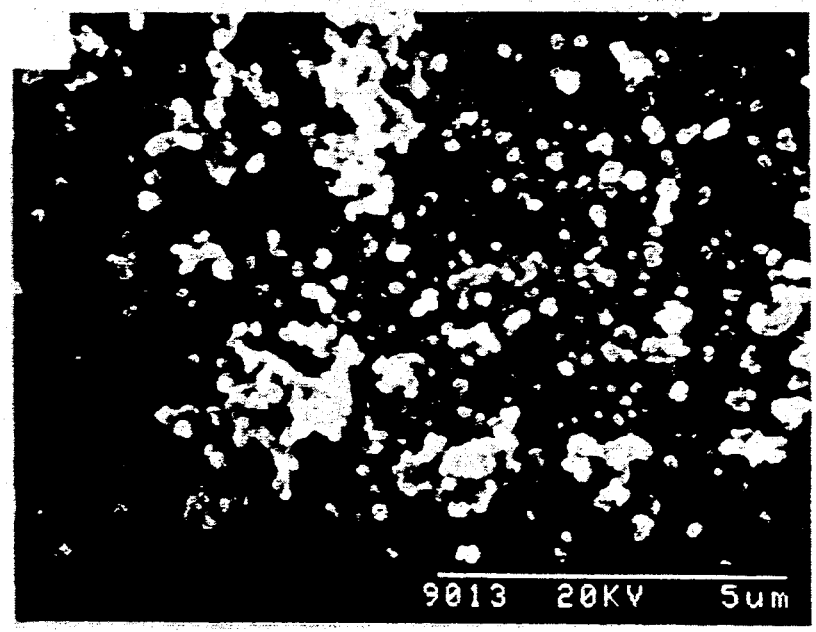
Figure 5A:
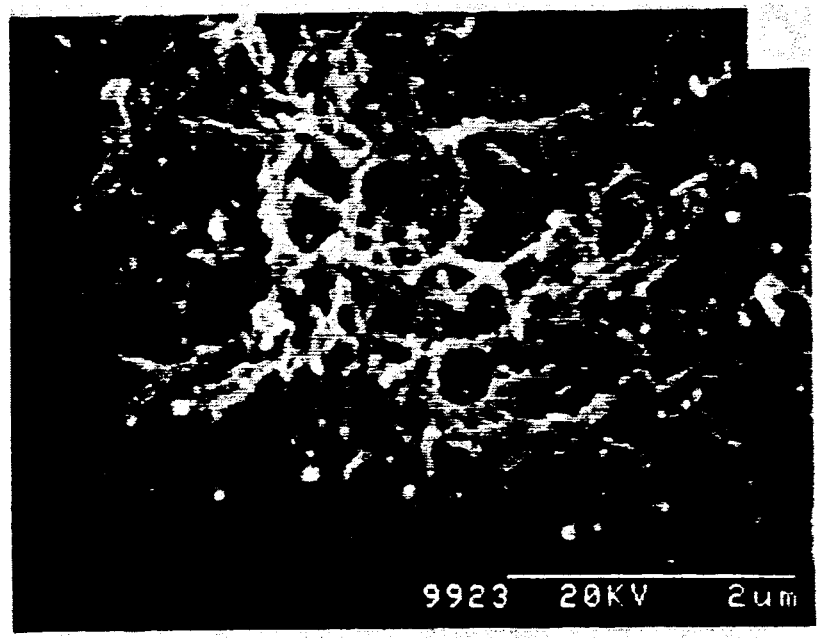
FIG. 5 is a scanning electron photomicrograph which in portion A (FIG. 5A) shows the surface topology of a specimen of poly(aniline) and in portion B (FIG. 5B) shows the surface topology of a specimen of a poly(aniline)-Prussian blue composition of the present invention, the magnification of FIG. 5 being greater than FIG. 4 and being indicated by the white horizontal line which reflects a length of 2 microns.
Figure 5B:
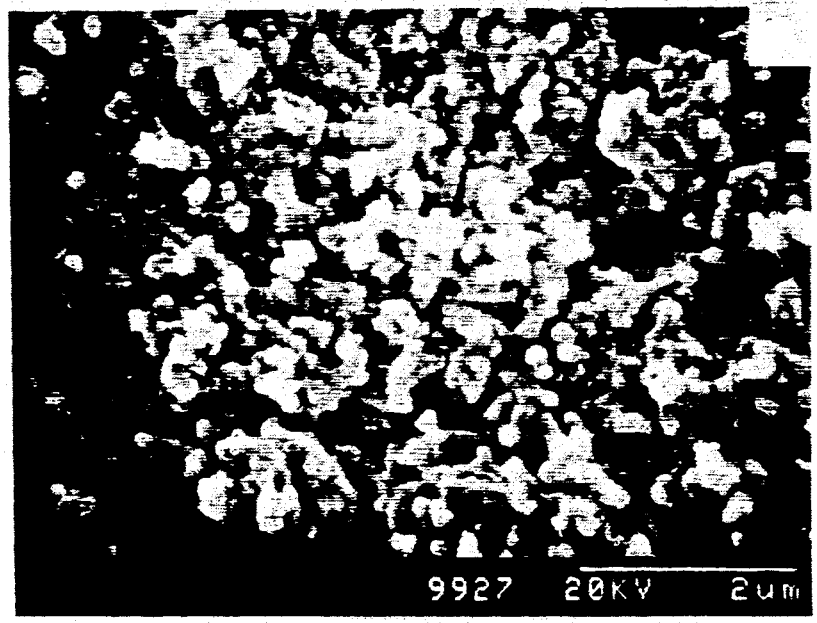

FIGS. 4 and 5 are scanning electron photomicrographs of the external surface topology of a poly(aniline)-covered electrode (FIGS. 4A and 5A) and a poly(aniline)-Prussian blue composite-covered sample (FIGS. 4B and 5B). FIG. 4B shows that the fairly uniform background of the poly(aniline) (see FIG. 4A gets heavily embedded with microgranules of Prussian blue which penetrate the surface of the poly(aniline) and extend outwardly from it when poly(aniline) is loaded with Prussian blue. FIG. 5B shows microgranules of Prussian blue coating the network structure of poly(aniline), such as is illustrated in FIG. 5A. These photomicrographs confirm that Prussian blue is coating at least a portion of the internal surfaces of the poly(aniline).

Stability tests of both Prussian blue and poly(aniline)/Prussian blue-derivatized electrodes were performed in an argon-degassed and sealed H-cell. The Prussian blue- or the poly(aniline)/Prussian blue-derivatized electrode (display electrode) was placed together with a Ag/AgCl reference electrode inside the same compartment of the H-cell while a platinum gauze counter electrode, derivatized also with the same material as the display electrode, was placed in the second compartment of the H-cell. The counterelectrode typically bears 1-5 times the electrochemically equivalent amount of material compared to the display electrode. The purpose of this is to provide the counterelectrode with a complementary reaction so that decomposition of the electrolyte solution, 0.5 molar aqueous $KHSO_4$, pH=0.8, would be minimized. The undesirable hydrogen evolution on the counter electrode was completely eliminated. The stability of the display electrode material was tested by cycling the potential continuously between −0.15 volt (discolored state) and +0.35 volt (colored state) at a rate of typically 100 millivolts per second. The reflectivity of the electrode was monitored by a helium-neon laser and a silicon photodiode simultaneously with the cycling of the electrical potential.

Figure 6:
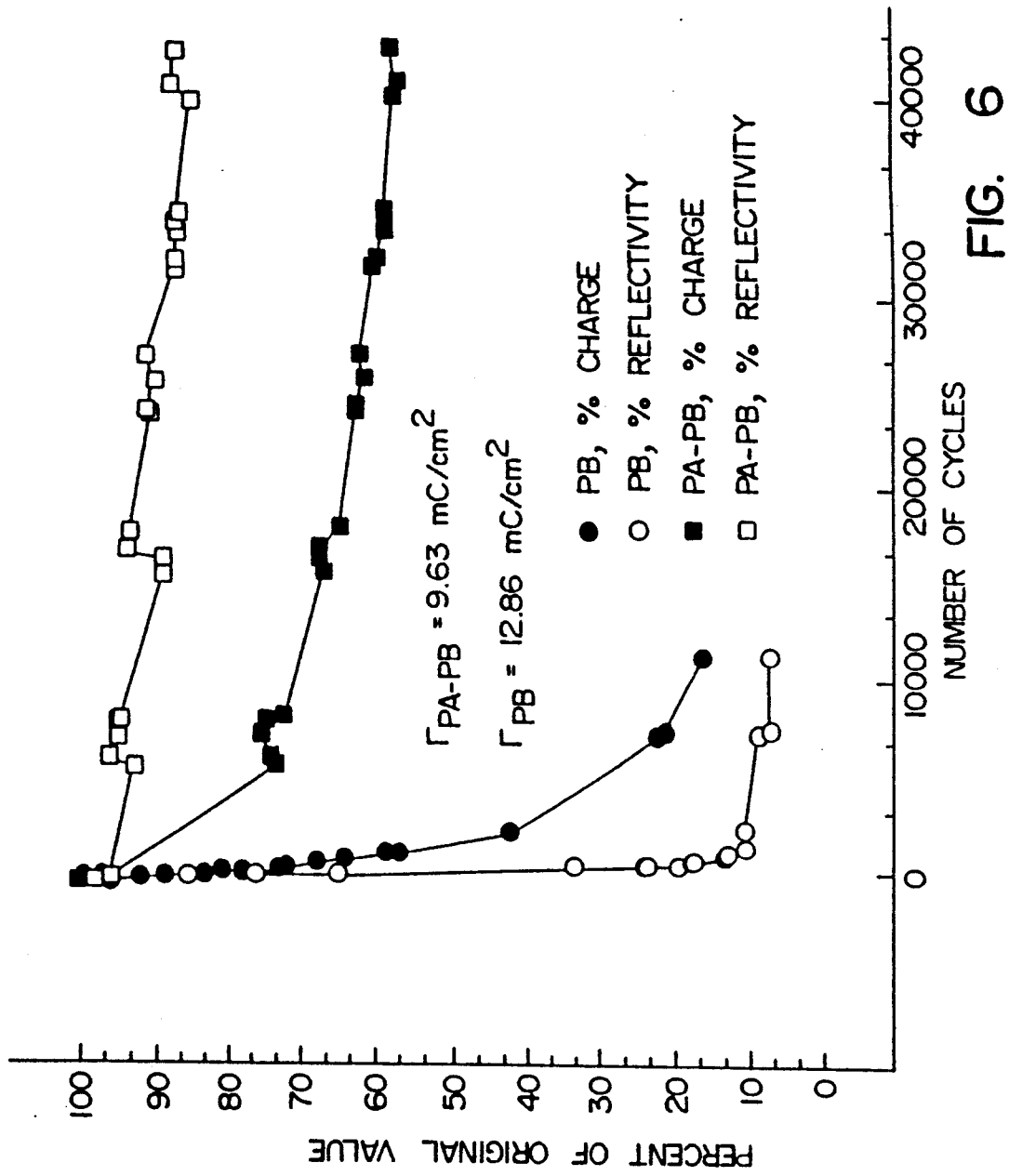
FIG. 6 is a comparative stability study of Prussian blue (circle showing), and of a poly(aniline)-Prussian blue composition of the present invention (square showing), upon repetitive cycling between their colorless and blue states.

The results indicate that the usual mode of decay of the Prussian blue-derivatized electrochromic electrodes, under these conditions, was the gradual development of slowly expanding areas where the color did not change but remained blue during electrochemical cycling. The appearance of these patchy areas was accompanied by a reduction of the area under the cyclic voltammetric wave and a loss of the ability of the electrode to modulate the reflectivity of light. Eventually the electrode remained permanently blue. These phenomena are shown in FIG. 6, together with results obtained from films of the poly(aniline)/Prussian blue composite material.

Poly(aniline)-Prussian blue-derivatized electrodes made in accordance with the invention remain effective longer under these experimental conditions, keeping their reflectivity close to maximum throughout the tests. In fact, no development of any patchy areas was observed, which probably reflects better adhesion between poly(aniline) and Prussian blue and the electrode as compared to that of Prussian blue alone on the electrode.

EXAMPLE 2

Preparation of Poly(3-Methylthiophene - Prussian Blue Composition

A poly(3-methylthiophene)-Prussian blue film in which poly(3-methylthiophene) was the electrically conductive polymer and Prussian blue the electrochromic compound was made as follows. Commercial potassium ferricyanide ($K_3[Fe(CN)_6]$), ferric sulfate ($Fe_2(SO_4)_3$), potassium chloride (KCl), potassium bisulfate ($KHSO_4$), hexaamine ruthenium trichloride ($[Ru(NH_3)_6]Cl_3$) and $CH_3CN$ (anhydrous) (all available commercially from Aldrich) were used as received. Sodium perchlorate ($NaClO_4$) (available from Aldrich) was dried at 75° C. under vacuum.

Deposition of poly(3-methylthiophene) was done electrochemically from a 0.1 molar solution of 3-methylthiophene in $CH_3CN$/ 1.0 molar of $NaClO_4$, by cycling the potential of the electrode from −0.1 volt to +1.8 volt. Two to three scans gave a light reddish coloration on the electrode.

Loading of poly-3-methylthiophene with Prussian blue was done by cycling a poly-3-methylthiophene-covered electrode between +0.65 volt and +0.25 volt in a $H_2O/CH_3CN$ (seven parts $H_2O$ to three parts $CH_3CN$ on a volume-to-volume basis) solution containing 0.5 molar concentration of $KHSO_4$ and 5 millimolar concentration of each of $K_3[Fe(CN)_6]$ and $Fe_2(SO_4)_3$.

Figure 7A:
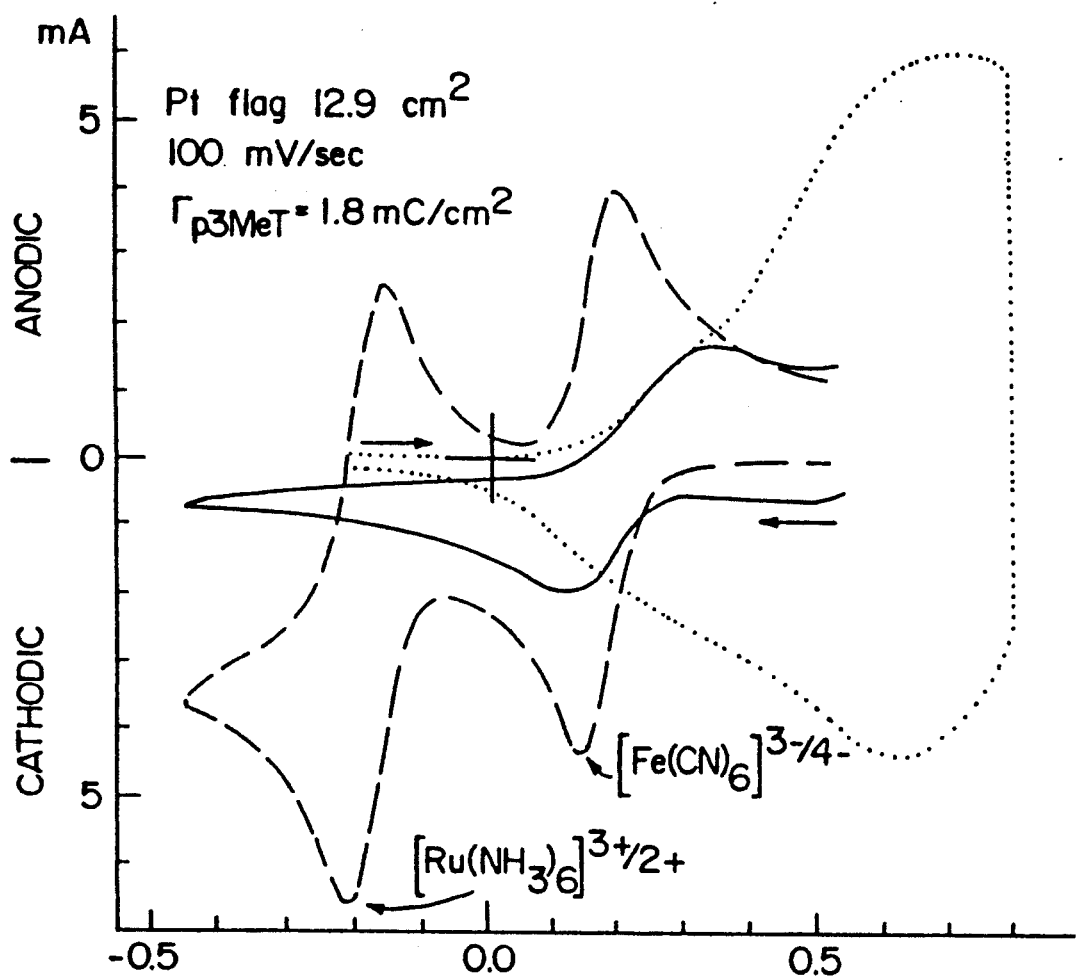
FIG. 7 is a drawing which in portion A (FIG. 7A) is a cyclic voltammogram of poly(3-methylthiophene) on a platinum electrode (dotted line showing), a cyclic voltommogram of the same poly(3-methylthiophene)-covered platinum electrode in a solution containing also potassium ferricyanide and hexaamine ruthenium chloride (solid line showing), and a cyclic voltammogram of a bare platinum electrode in the same solution that contains also potassium ferricyanide and hexamine ruthenium chloride (dashed line showing), and which in portion B (FIG. 7B; is a conductivity profile that shows as a function of potential (i.e., oxidation state) the current that passes between two electrodes (see inset schematic diagram) covered and connected by poly(3-methylthiophene) (open circle showing), or by a poly(3-methylthiophene)-Prussian blue composition of the present invention (solid circle showing)
Figure 7B:
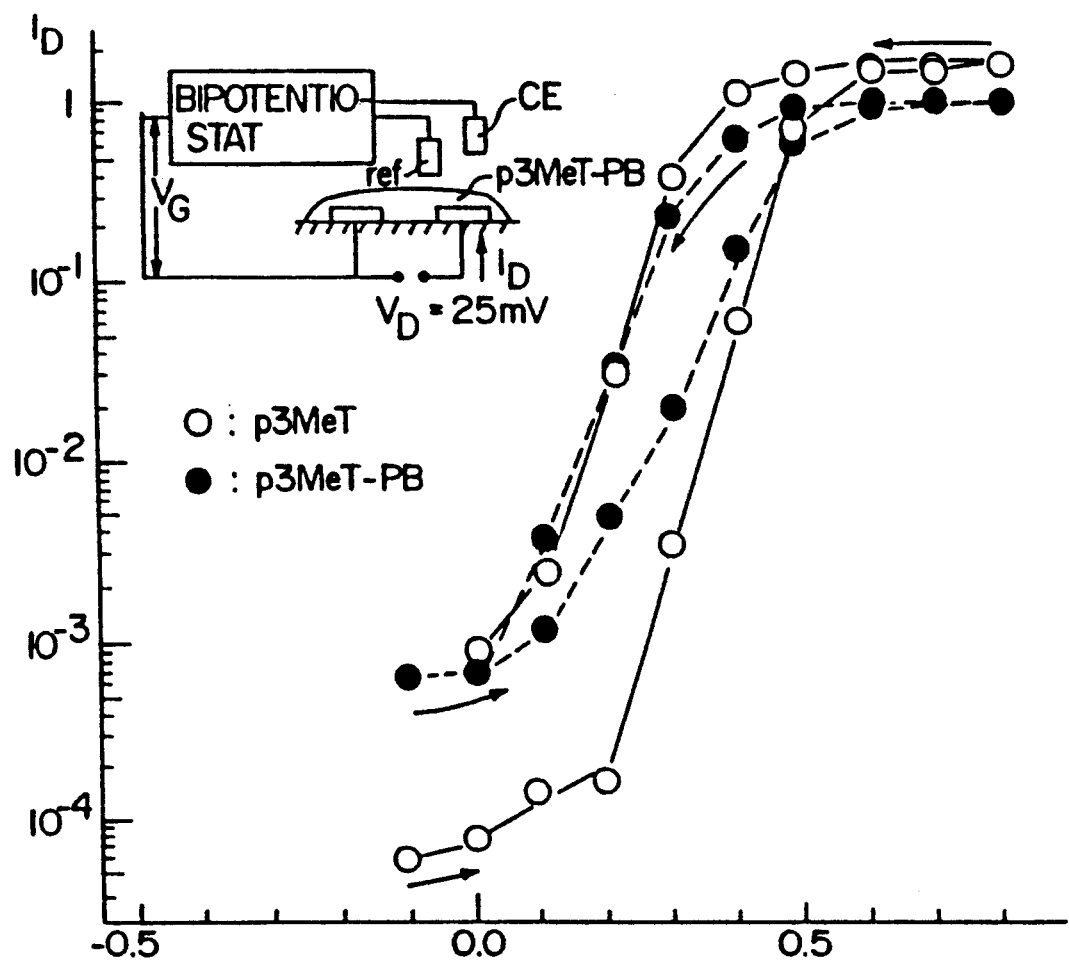

Prussian blue electrodeposition involves reduction of $[Fe(CN)_6]^{3-}$. FIG. 7 describes the conditions under which the $[Fe(CN)_6]^{3-}$ species is reduceable on poly(3-methylthiophene). FIG. 7A illustrates the cyclic voltammogram of a poly(3-methylthiophene) derivatized platinum flag electrode in $CH_3CN$/1.0 molar $NaClO_4$ at a coverage ($\Gamma$) equivalent to 1.8 mC/cm$^2$. The same electrode then is characterized by cyclic voltammetry in an equimolar solution (2.5 millimolar each) of $K_3[Fe(CN)_6]$, and $[Ru(NH_3)_6]^{3+}$, where it responds only to $[Fe(CN)_6]^{3-}$, while the same platinum electrode was reducing both species before it was derivatized with poly(3-methylthiophene). The results shown in FIG. 7 suggest that the poly(3-methylthiophene) film covering the platinum electrode can be made pinhole free. Moreover, it was observed that while the position of the $[Fe(CN)_6]^{3-}$ reduction wave remained unchanged between the bare platinum and the poly(3-methylthiophene)-derivatized platinum electrode (see FIG. 7A), the size of the peak current is diminished in the latter case. This result can be explained by consulting FIG. 7B which demonstrates how the conductivity of poly(3-methylthiophene) varies with potential. The data shown in FIG. 7B were obtained following procedures well known in the art using an interdigitated array of microwires connected with poly(3-methylthiophene). As can be seen from FIG. 7B poly(3-methylthiophene) was only partially conducting (and that due only to a significant hysteresis) in the potential region where $[Fe(CN)_6]^{3-}$ was reduced. This means that only a fraction of the entangled polymeric chains of poly(3-methylthiophene) were conducting, thus making the polymer effectively an electrode having a diminished effective area compared to the underivatized platinum electrode underneath. The re-oxidation of $[Fe(CN)_6]^{4-}$ in the return scan of the poly(3-methylthiophene)-derivatized electrode, was delayed until a more positive potential was reached, presumably waiting until poly(3-methylthiophene) became more conductive. The same behavior was also observed for the Prussian blue-loaded poly(3-methylthiophene) electrodes when compared to platinum electrodes having only Prussian blue on them (see FIG. 11.).

Prussian blue was deposited into the poly(3-methylthiophene) layer, following the method described in Example 1. Use of a mixed solvent ($H_2O/CH_3CN$, 7:3 volume to volume) seemed to ensure proper swelling of the poly(3-methylthiophene) layer and optimum deposition conditions for Prussian blue.

Figure 11:
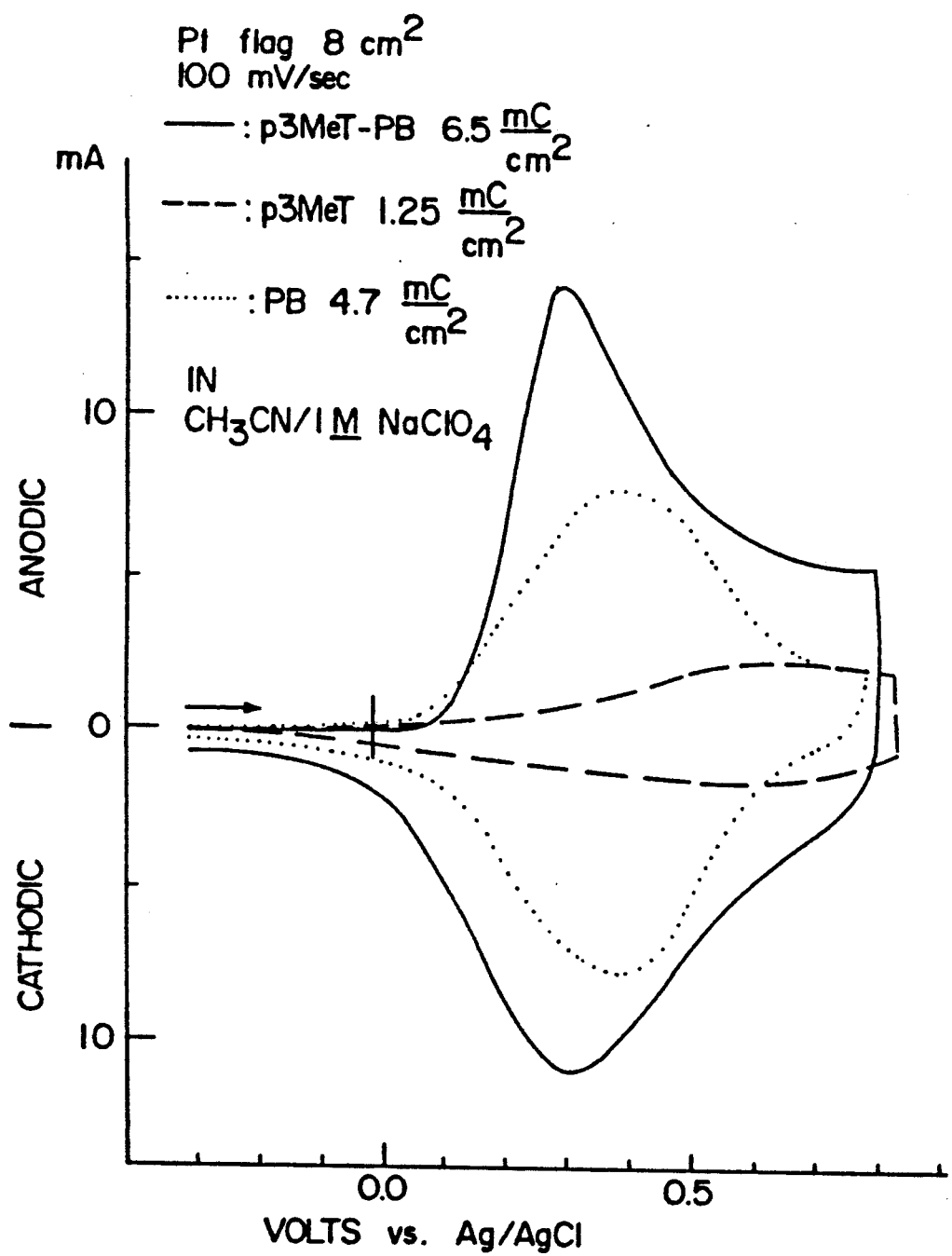
FIG. 11 is a drawing which in the left half portion is a cyclic voltammogram of poly(3-methylthiophene) on a platinum electrode (dashed line showing), Prussian blue on a platinum electrode (dotted line showing) and a poly(3-methylthiophene)-Prussian blue composition of the invention on a platinum electrode (solid line showing), and which in portion A (FIG. 11A) is a drawing of the cyclic voltammetric anodic peak current versus the scan rate of Prussian blue alone and for poly(3-methylthiophene) alone, and in portion B (FIG. 11B) is a drawing of the cyclic voltammetric anodic peak current versus the scan rate for a poly(3-methylthiophene)-Prussian blue composition of the invention.

FIG. 11 shows the cyclic voltammetric characterization of the poly(3-methylthiophene)-Prussian blue composite (solid line showing) in a CH$_3$CN/1.0 molar NaClO$_4$ electrolyte. For comparison purposes the cyclic voltammogram of poly(3-methylthiophene) before Prussian blue deposition (dashed line showing), and of the same electrode derivatized with Prussian blue only (dotted line showing) are given for the same electrolyte.

Figure 11A:
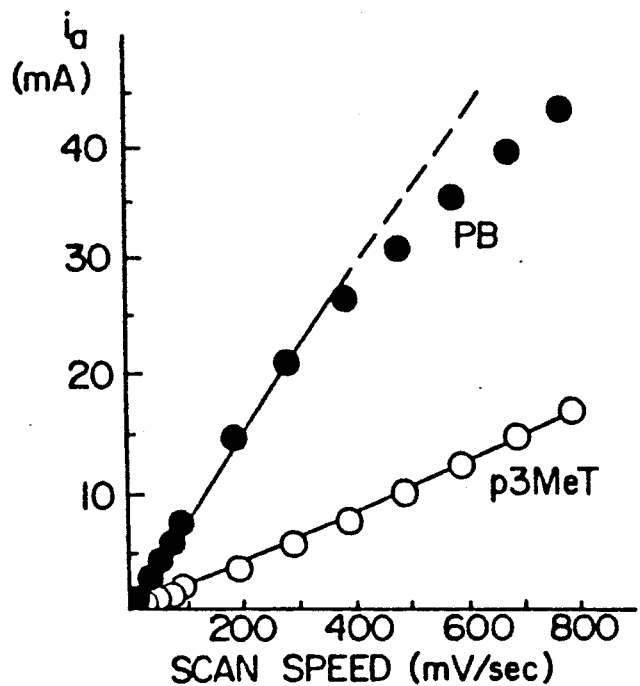
Figure 11B:
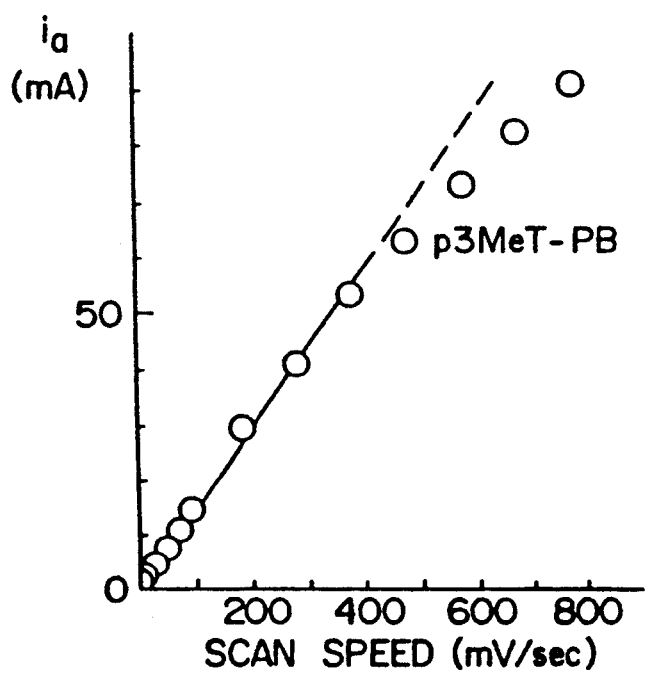

Good electrochromic results are obtained when Prussian blue is in 5 times molar excess over poly(3-methylthiophene) (five redox active units per monomer unit) (FIG. 11). It was observed that the pale red electrode at negative voltages turned deep blue upon oxidation. Under these conditions the cyclic voltammogram of the poly(3-methylthiophene)-Prussian blue composite was dominated by Prussian blue. Moreover, the insets of FIG. 11 (FIGS. 11A & 11B) show that the scan rate dependence of the oxidative peak current is linear for all the components of the composite (FIG. 11A) and for the composite itself (FIG. 11B). This behavior can be attributed to a kinetic control of the redox reaction by the diffusion and migration of ions within the layer of the surface-confined material, rather than to diffusion of ions in and out of the film.

Figure 8:
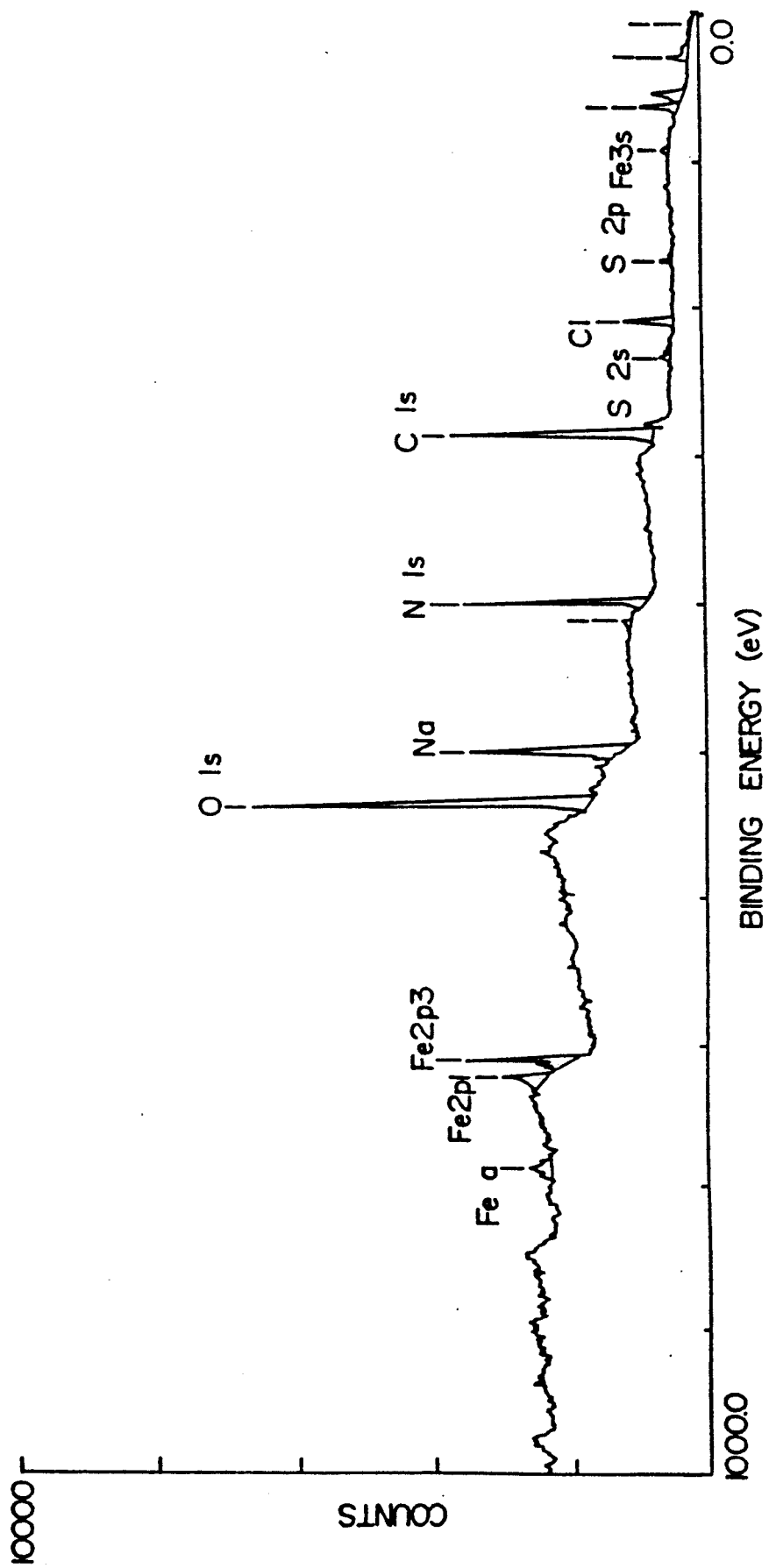
FIG. 8 is an ESCA spectrum of a poly(3-methylthiophene)-Prussian blue composition in accordance with the present invention.

FIG. 8 shows the ESCA surface analysis data for the poly(3-methylthiophene)-Prussian blue composite. The sample was characterized by cyclic voltammetry in CH$_3$CN/1.0 molar NaClO$_4$ before measurements were taken and it was disconnected from the potential control at +0.5 volts so that the material was in its blue state. At that potential poly(3-methylthiophene) is partially oxidized and it is expected to retain some electrolyte. This fact explains the relatively strong sodium chlorine and oxygen peaks in the spectrum. On the other hand peaks that correspond to both poly(3-methylthiophene) and Prussian blue were observed which indicates that Prussian blue does not just lay on the surface of poly(3-methylthiophene), but is distributed throughout the polymer, covering, at least partially, the surfaces of the poly(3-methylthiophene) polymeric chains within the bulk of the polymer.

FIGS. 9 and 10 show scanning electron photomicrographs of the surface topology of the poly(3-methylthiophene)-Prussian blue composite under a scanning electron microscope. By comparing the bottom photomicrograph (FIGS. 9B and 10B:(poly(3-methylthiophene)-Prussian blue composite), to the top one (FIG. 9A and 10A:poly(3-methylthiophene) only), it is apparent that the fairly uniform polymeric background gets heavily embedded with microgranules of Prussian blue when poly(3-methythiophene) is derivatized with Prussian blue.

The adhesion of Prussian blue on the poly(3-methylthiophene) polymer can be attributed to coordination of terminal Fe(II) with the sulfur atoms of the poly(3-methylthiophene) backbone. Such coordination is expected to have a minimal effect on the conductivity of poly(3-methylthiophene) since the sulfur site in poly(3-methylthiophene) is only weakly interacting with the II-electron system of the polymeric backbone. Indeed, the conductivity of poly(3-methylthiophene) remains approximately the same after impregnation with Prussian blue as can be seen in FIG. 7.

EXAMPLE 3

Preparation of Poly(Pyrrole) - Prussian Blue Composition

In this Example a poly(pyrrole)-Prussian blue film in which poly(pyrrole) was the electrically conductive polymer and Prussian blue the electrochromic compound was made. Deposition of poly(pyrrole) was done electrochemically from a 0.18 molar solution of pyrrole in CH$_3$CN/1.0 molar NaClO$_4$, by cycling the potential of the electrode from $-0.6$ to $+0.75$ volts (vs. an Ag-/AgCl reference electrode.) Poly(pyrrole) grows slowly, and it appears as a yellow film at the negative end of each cycle and decolorizes completely at the positive end.

Loading of poly(pyrrole) with Prussian blue is accomplished by cycling a poly(pyrrole) covered electrode between 0.6 volts and $+0.25$ volts in an aqueous solution containing 0.5 molar K$_2$SO$_4$, and 5 millimoles of each of K$_3$[Fe(CN)$_6$] and Fe$_2$(SO$_4$)$_3$.

Figure 12:
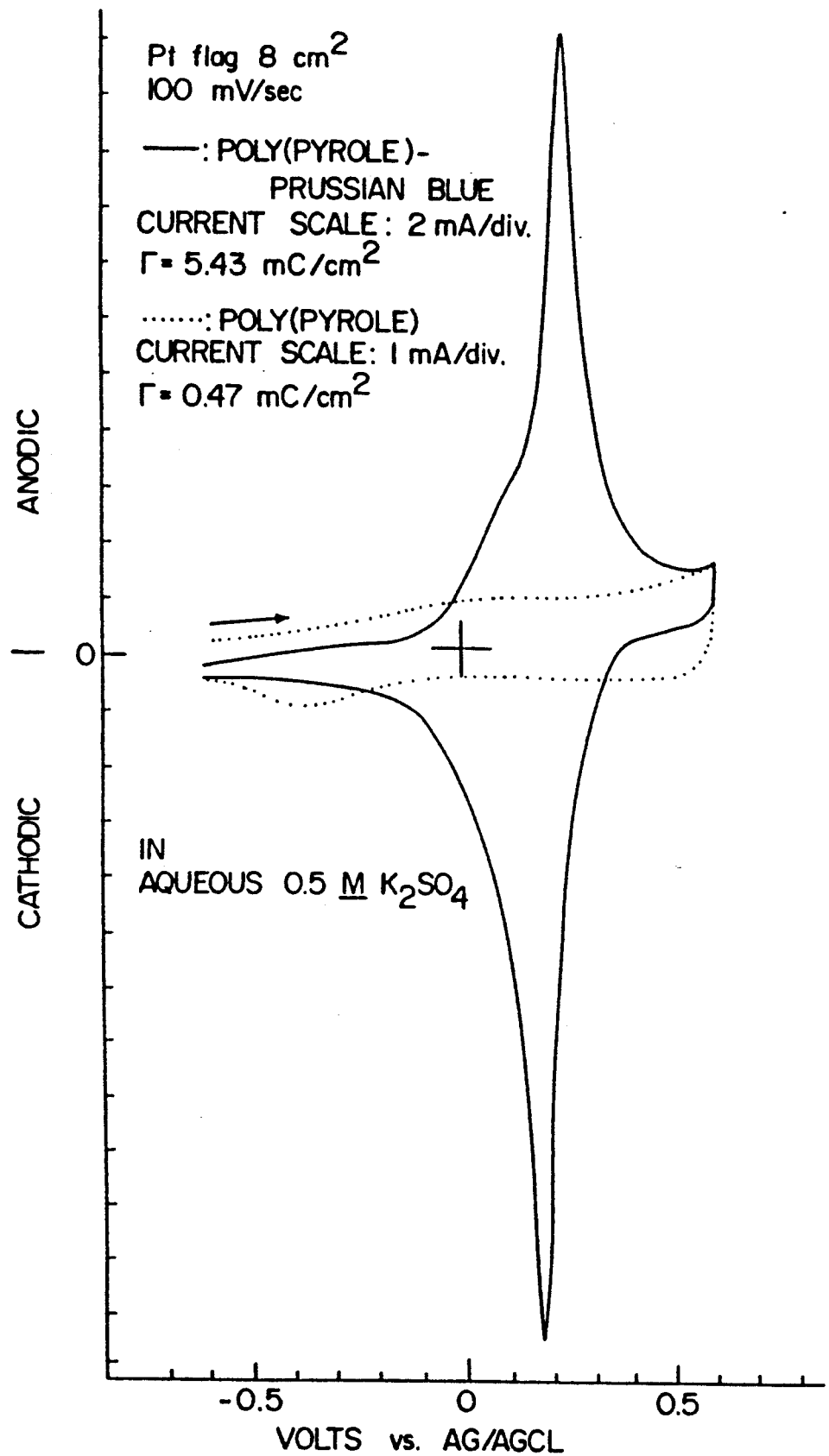
FIG. 12 is a cyclic voltammogram poly(pyrrole)-Prussian blue composite of the present invention in an aqueous electrolyte.

Poly(pyrrole) becomes conducting upon oxidation in both aqueous and non-aqueous electrolytes. Therefore, it is expected that the poly(pyrrole)-Prussian blue composite will be operable in both aqueous and non-aqueous environments. Prussian blue is stable and electrochromic in various non-aqueous solvents like CH$_3$CN upon Na$^+$ or Li$^+$ intercalation. It is known that in aqueous solutions Prussian blue takes up K$^+$ upon reduction to turn into the colorless Everitt's salt. FIG. 12 shows the cyclic voltammetric characterization of platinum electrode derivatized with poly(pyrrole)-Prussian blue composite in an aqueous electrolyte that contains 0.5 molar K$_2$SO$_4$. According to these data the composite contains 10.6 times as many redox-active units attributable to Prussian blue as those attributable to pyrrole monomer units.

Figure 13:
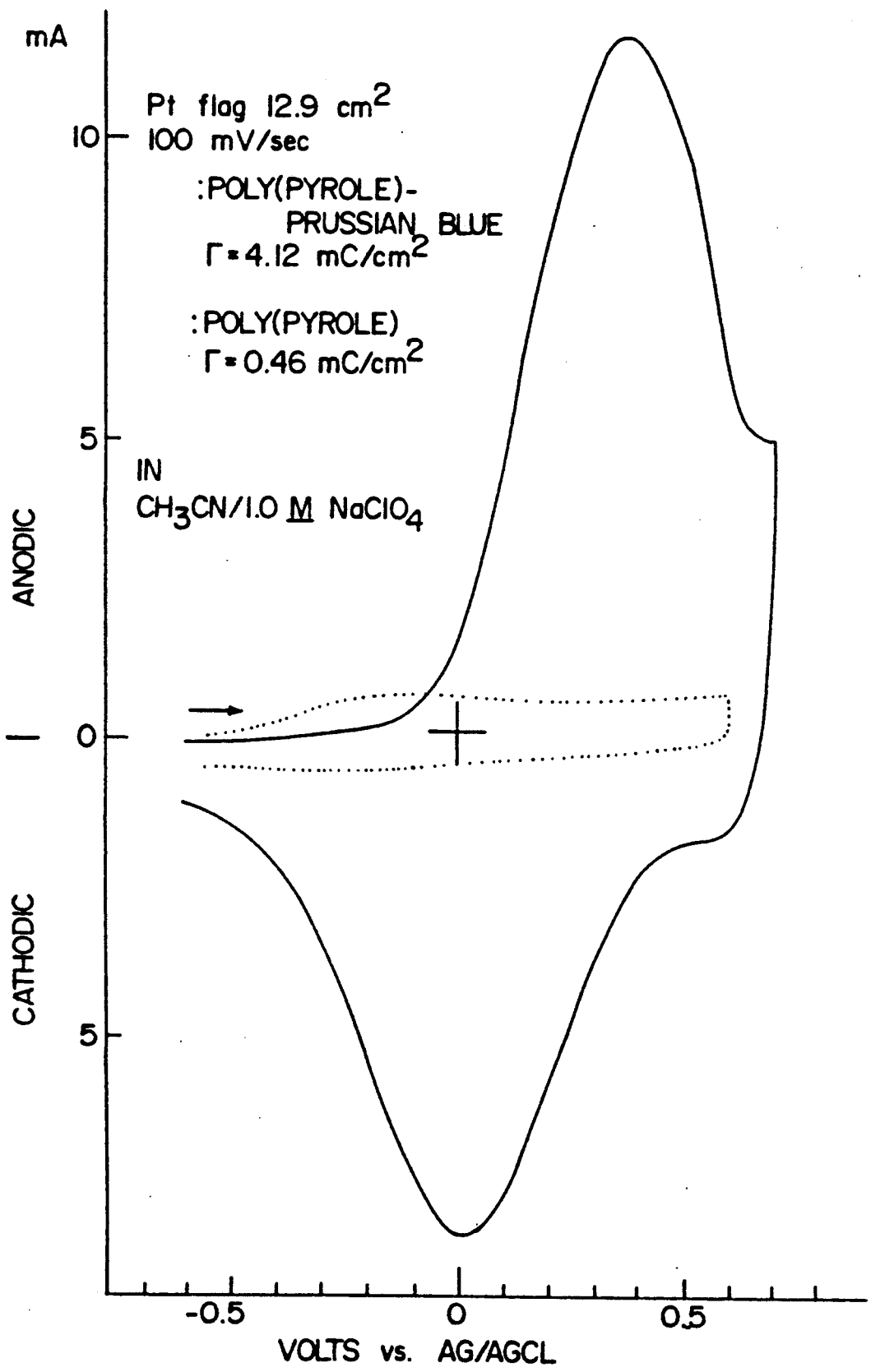
FIG. 13 is a cyclic voltammogram of poly(pyrrole) on a platinum electrode (dotted line showing) and of poly(pyrrole)-Prussian blue composition of the present invention in a nonaqueous electrolyte.

Similarly, FIG. 13 shows the cyclic voltammetric characterization of a platinum electrode derivatized with a poly(pyrrole)-Prussian blue composite in a CH$_3$CN/1.0 molar NaClO$_4$ electrolytic solution. According to these data the composite contains 7.9 times as many redox active units attributable to Prussian blue as those attributable to pyrrole monomer.

As we can see from the data of FIGS. 12 and 13 the method of the present invention of impregnating a conductive polymer with a substance like Prussian blue (i.e. a substance that can be electrochemically formed and electrodeposited) can provide films with variable compositions.

Composite films in accordance with the present invention take advantage of the fast switching speed of thin poly(aniline) films, their apparent enhanced surface area compared to the bare electrode, and the intense color of Prussian blue. It is also an advantage that both components, (i.e., poly(aniline) and Prussian blue, when reduced are pale yellow (polyaniline) or colorless (Everitt's salt: the reduced form of Prussian blue in Equation 2), while when oxidized both turn blue. These properties are a distinct advantage for electrochromic display applications.

In an alternative embodiment of the invention the compound may be incorporated directly into the molecular structure of the electrically conductive polymer.

Composite materials in accordance with the invention as well as having application in electrochromic devices also have additional application in energy storage devices (high density charge capacitors and batteries) and in electrocatalysis.

We claim:
1. A composition comprising
   (a) an electrically conductive polymer having an open internal pore structure and
   (b) a compound electrochemically formed in situ within the internal pore structure of the conductive polymer and coating at least a portion of the surfaces of the internal pore structure.

2. A composition according to claim 1 wherein said compound has electrochromic properties.

3. A composition according to claim 1, wherein said compound has catalytic properties.

4. A composition according to claim 1, wherein said compound has high density charge capacitance properties.

5. A composition according to claim 1, wherein said polymer is a polymer of a monomer selected from the group consisting of aniline, 3-alkylthiophene, 2-aminonaphthalene, 3-aminonaphthalene, 2-aminopyrene, thiophene, 2,2'-bithiophene, isothianaphthene, thiophenol, thienylenevinylene, furan, pyrrole, N-methylpyrrole and N-phenylpyrrole.

6. A composition according to claim 1 wherein said compound comprises a metal cyanometallate or a metal oxide bonded covalently to said polymer.

7. A composition according to claim 5 wherein said polymer is poly(aniline), poly(3-methylthiophene) or poly(pyrrole).

8. A composition according to claim 1 wherein said compound is Prussian blue.

9. A composition comprising
   (a) an electrically conductive polymer selected from the group consisting of aniline, 3-alkylthiophene, 2-aminonaphthalene, 3-aminonaphthalene, 2-aminopyrene, thiophene, 2,2'-bithiophene, isothianaphthene, thiophenol, thienylenevinylene, furan, pyrrole, N-methylpyrrole and N-phenylpyrrole, said polymer having an open internal pore structure and
   (b) an electrochromic compound comprising a metal cyanometallate forming a coating on at least a portion of the surfaces of the internal pore structure.

10. A composition according to claim 9 wherein said polymer is poly(aniline), poly(3-methylthiophene) or poly(pyrrole) and said electrochromic compound comprises Prussian blue.

11. A method of making a composition comprising
   (i) forming an electrically conductive polymer having an open internal pore structure,
   (ii) contacting the surfaces of the internal pore structure of said polymer with a solution comprising chemical species capable of being electrochemically formed within the internal pore structure into a coating material on said surfaces and
   (iii) electrochemically forming said coating material on said surfaces.

12. A method as recited in claim 11 wherein said coating material has electrochromic, catalytic or high density charge capacitance properties.

13. A method as recited in claim 11 wherein said polymer comprises a polymer of a monomer selected from the group consisting of aniline, 3-alkylthiophene, 2-aminonaphthalene, 3-aminonaphthalene, 2-aminopyrene, thiophene, 2,2'-bithiophene, isothianaphthene, thiophenol, thienylenevinylene, furan, pyrrole, N-methylpyrrole and N-phenylpyrrole, and said coating material comprises a metal cyanometallate or a metal oxide.

14. A method as recited in claim 11 wherein said compound is Prussian blue.

15. A method as recited in claim 11 wherein said polymer and compound are sequentially electrodeposited on an electrode.

16. A composition formed by a method comprising
   (i) forming an electrically conductive polymer having an open internal pore structure,
   (ii) contacting the surfaces of the internal pore structure of said polymer with a solution comprising chemical species capable of being electrochemically formed within the internal pore structure into a coating material on said surfaces, and
   (iii) electrochemically forming said coating material on the surfaces of said structure.

17. An electrochemical cell comprising an electrode which includes
   (a) an electrically conductive polymer having an open internal pore structure and
   (b) an electrochromic compound electrochemically formed in situ within the internal pore structure of the polymer and coating at least a portion of the surfaces of the internal pore structure.

18. An electrode having a coating thereupon which includes
   (a) an electrically conductive polymer having an open internal pore structure and
   (b) an electrochromic compound electrochemically formed in situ within the internal pore structure of the polymer and coating at least a portion of the surfaces of the internal pore structure.

19. An electrochromic display comprising an electrochemical cell which includes
   (a) an electrically conductive polymer having an open internal pore structure and
   (b) an electrochromic compound comprising a metal cyanometallate, said compound forming a coating on at least a portion of the surfaces of said internal pore structure.

20. A composition comprising
   (a) an electrically conductive polymer having an open internal pore structure and
   (b) a compound electrochemically formed in situ within the internal pore structure of the conductive polymer and distributed within the internal pore structure.

21. A composition according to claim 1 wherein said compound comprises a metal cyanometallate or a metal oxide.

* * * * *